United States Patent
Mir et al.

(10) Patent No.: US 10,284,129 B2
(45) Date of Patent: May 7, 2019

(54) THREE-PHASE VARIABLE REFERENCE PULSE WIDTH MODULATION

(71) Applicant: Eaton Corporation, Cleveland, OH (US)

(72) Inventors: Sayeed Ahmed Mir, Saginaw, MI (US); John David Neely, Kentwood, MI (US); Stan Lawrence Seely, Byron Center, MI (US); John Mendenhall White, Hudsonville, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/251,186

(22) Filed: Aug. 30, 2016

(65) Prior Publication Data
US 2017/0077856 A1    Mar. 16, 2017

Related U.S. Application Data

(60) Provisional application No. 62/219,388, filed on Sep. 16, 2015.

(51) Int. Cl.
| | | |
|---|---|---|
| H02P 23/00 | (2016.01) | |
| H02P 25/03 | (2016.01) | |
| H02P 27/08 | (2006.01) | |
| H02P 27/04 | (2016.01) | |
| H02M 7/5387 | (2007.01) | |
| H02M 7/48 | (2007.01) | |

(52) U.S. Cl.
CPC ...... *H02P 23/0077* (2013.01); *H02M 7/5387* (2013.01); *H02P 25/03* (2016.02); *H02P 27/04* (2013.01); *H02P 27/08* (2013.01); *H02M 7/48* (2013.01); *H02P 2209/13* (2013.01)

(58) Field of Classification Search
CPC ...... H02P 7/29; H02P 8/10; H02P 8/18; H02P 27/08; H02P 23/00; H02P 25/00
See application file for complete search history.

(56) References Cited

U.S. PATENT DOCUMENTS

| | | | | |
|---|---|---|---|---|
| 6,751,105 B2* | 6/2004 | Yamanaka | ............ | H02M 7/483 318/801 |
| 2001/0048278 A1* | 12/2001 | Young | ............ | H02P 6/085 318/400.29 |
| 2005/0194925 A1* | 9/2005 | Ito | ............ | H02P 27/085 318/801 |
| 2005/0206341 A1* | 9/2005 | Yin Ho | ............ | H02P 8/12 318/812 |

(Continued)

FOREIGN PATENT DOCUMENTS

EP    2 503 680 A2    9/2012

OTHER PUBLICATIONS

Extended European Search Report for Application No. 16188688.2 dated Feb. 21, 2017.

*Primary Examiner* — Eduardo Colon Santana
*Assistant Examiner* — Said Bouziane
(74) *Attorney, Agent, or Firm* — Merchant & Gould P.C.

(57) ABSTRACT

A system includes a three phase AC or brushless DC motor, an inverter and a controller. The inverter is electrically coupled to the motor. The controller is -electrically coupled to the inverter. The controller is configured to control the inverter to deliver a three phase pulse width modulated voltage to the AC motor, wherein the three phase pulse width modulation comprises a repeating two-cycle pattern.

14 Claims, 5 Drawing Sheets

(56) References Cited

U.S. PATENT DOCUMENTS

2008/0169780 A1* 7/2008 Pirozzi .............. H02M 7/53873
  318/599
2013/0330207 A1* 12/2013 Nakajima ............... F04B 17/03
  417/44.1

* cited by examiner

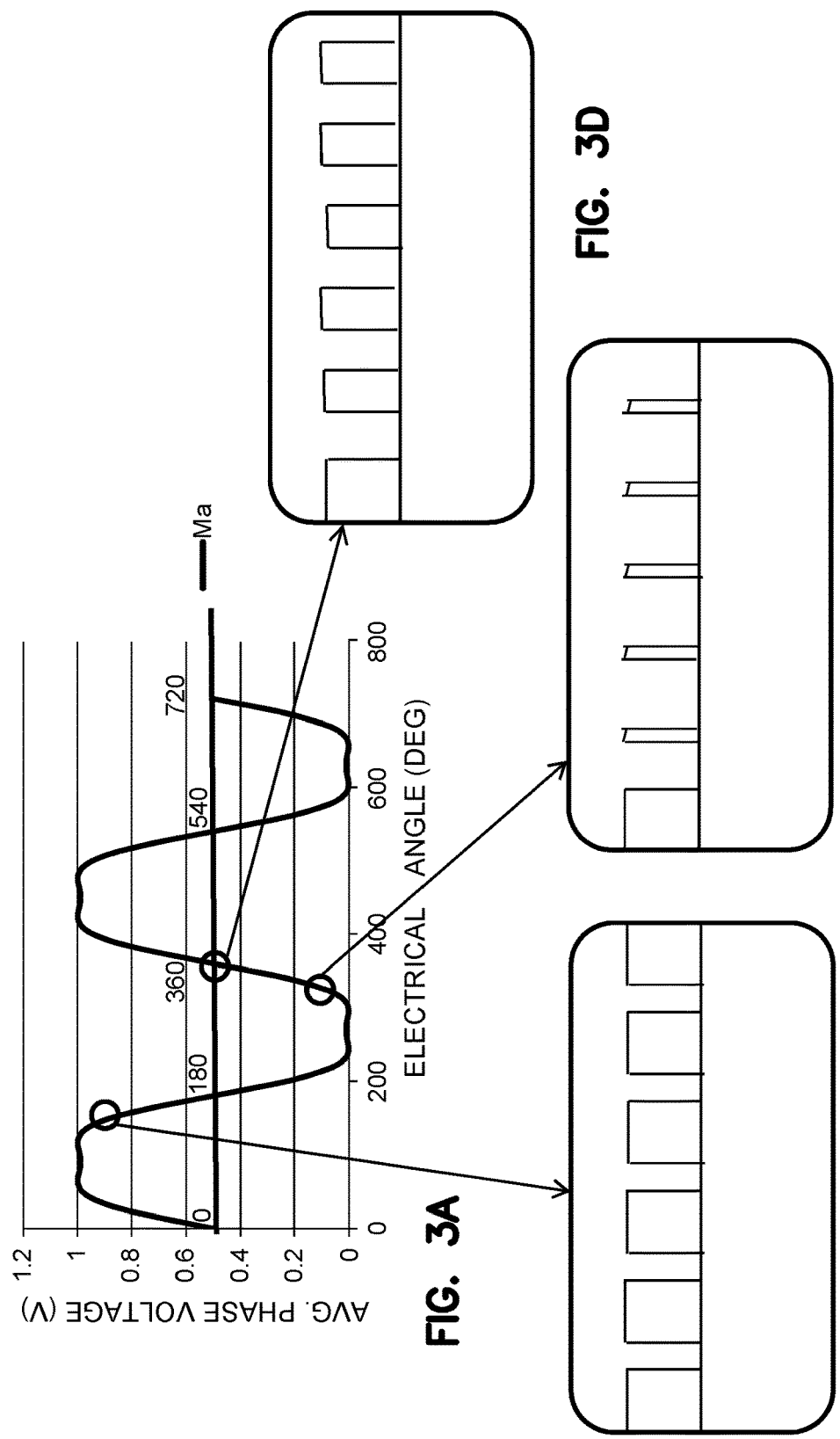

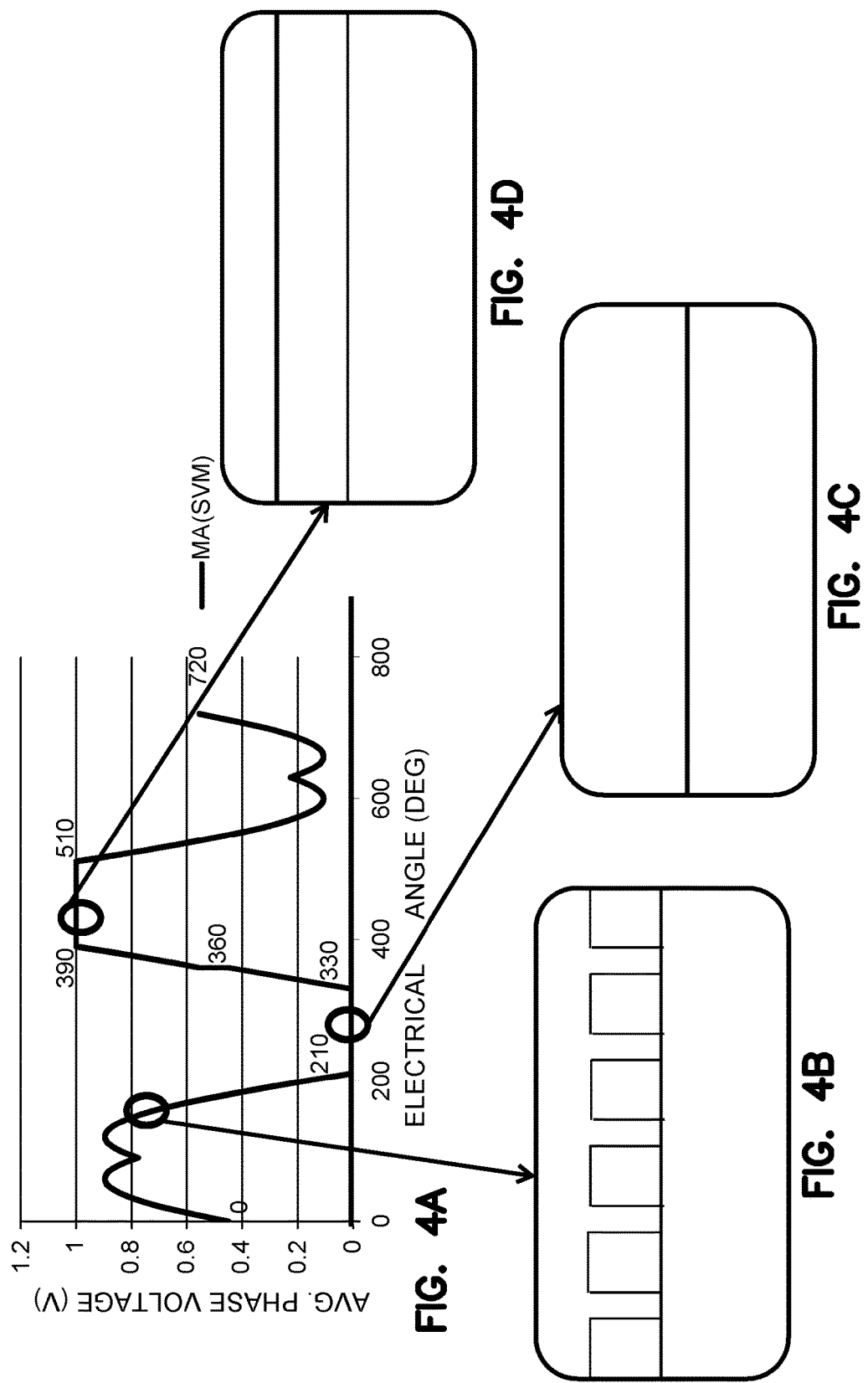

US 10,284,129 B2

THREE-PHASE VARIABLE REFERENCE PULSE WIDTH MODULATION

CROSS-REFERENCE TO RELATED APPLICATION

This application claims the benefit of U.S. Patent Application Ser. No. 62/219,388, filed Sep. 16, 2015, which is incorporated herein by reference in its entirety.

FIELD OF THE DISCLOSURE

The present disclosure generally relates to pulse width modulation schemes for three-phase motors and, more particularly to pulse width modulation schemes utilizing a two-cycle pattern that employs a first reference voltage in the first cycle of the pattern and a second reference voltage in the second cycle of the pattern.

BACKGROUND OF THE DISCLOSURE

Modern electrical machines incorporating three-phase AC or brushless DC motors, e.g., hydro-electric motor pumps, electro-mechanical actuators, etc., utilize pulse width modulation (PWM) to control the average voltage applied to the motor windings. Velocity and current control loops feed the PWM loop the necessary commands to achieve a desired velocity or current (torque). Various PWM schemes, e.g., six-step and sinusoidal, have been used in the past to produce a desired output. However, the industry trend has been migrating away from six-step (trapezoidal) and sinusoidal PWM to more mathematically complex but more efficient space vector PWM due to better performance at both low and high speed motor operation. However, the down side to both sinusoidal and space vector PWM is the significant number of switching events occurring in the power electronics; each switching event may introduce increased power losses. Further, various PWM schemes have been known to create hot spots within the power electronics by utilizing the electronics in an unevenly distributed manner. And, some PWM schemes that are utilized with traditional inverter bootstrapping gate drive topologies prevent operation at 100% PWM duty ratio.

SUMMARY

One aspect of this disclosure is directed to a system that includes a three phase AC or brushless DC motor, an inverter and a controller. The inverter is electrically coupled to the -motor. The controller is electrically coupled to the inverter. Further, the controller is configured to control the inverter to deliver a three phase pulse width modulated voltage to the motor, wherein the three phase pulse width modulation comprises a repeating two-cycle pattern.

Another aspect of this disclosure is directed to controlling the voltage delivered to a three phase AC motor or brushless DC motor with pulse width modulation. The pulse width modulation is a two-cycle pulse width modulation with the first cycle being a ground reference pulse width modulation and the second cycle being a DC bus reference modulation.

Still another aspect of this disclosure is directed to a controller. The controller includes a programmable device that is configured to execute a program of instructions. The instructions of the program direct the programmable device to control a plurality of switches in a DC powered inverter to produce an average AC voltage output. The average AC voltage output is defined by two electrical cycles. Each of the two electrical cycles uses a different reference voltage to produce the average AC output voltage.

The above summary is not intended to describe each embodiment or every implementation. A more complete understanding will become apparent and appreciated by referring to the following detailed description and claims in conjunction with the accompanying drawings.

DESCRIPTION OF THE DRAWINGS

FIGS. 3A-3D comprise a graphical illustration of a pulse width modulation (PWM) scheme configured to produce a sinusoidal average phase voltage.

FIGS. 4A-4D comprise a graphical illustration of three-phase variable reference PWM in accordance with various embodiments of the present disclosure.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is directed to a pulse width modulation (PWM) scheme that may be utilized with three-phase AC or brushless DC motors, such as those found in hydro-electric motor pumps or electro-mechanical actuators. The present PWM scheme comprises a two-cycle pattern that employs a first reference voltage in the first cycle of the pattern and a second reference voltage in the second cycle of the pattern. The three-phase variable reference PWM scheme described herein operates to reduce inverter losses resulting in higher operating efficiencies and more even thermal heating of the power electronic devices, e.g., reduced hot spots. Moreover, the disclosed PWM scheme may be implemented within the software/firmware of an existing, or new, programmable controller, e.g., processor, microprocessor, field programmable gate array (FPGA), etc. In the instance of an existing programmable controller, no additional hardware and no additional cost is required for implementation.

Figure 1:
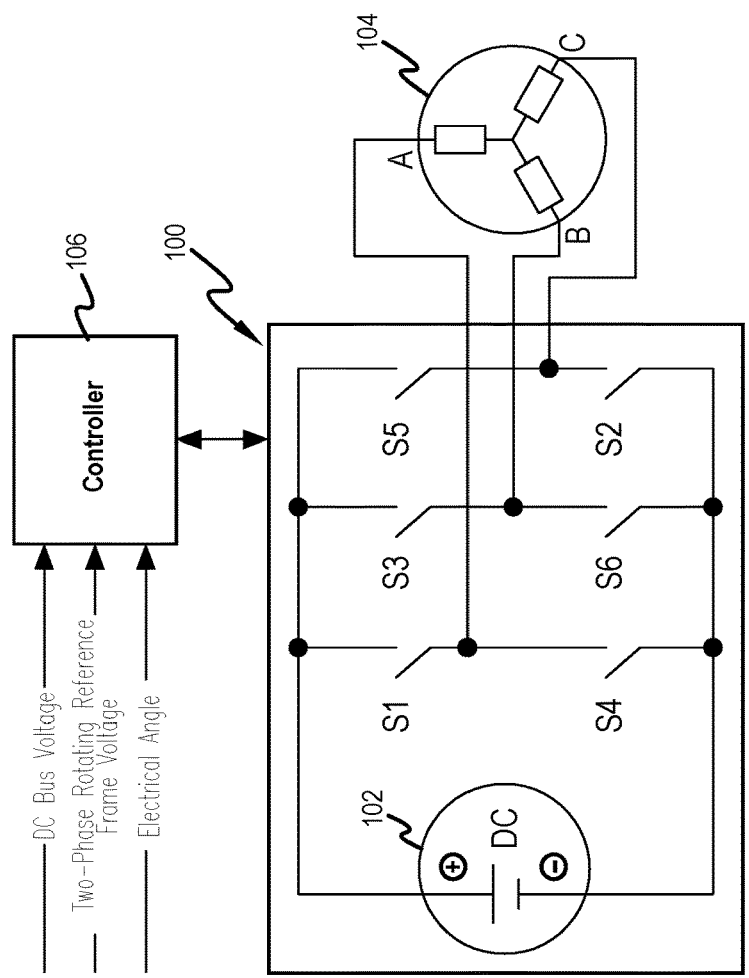
FIG. 1 is a block diagram illustrating a three-phase inverter circuit coupled to an AC motor.

The three-phase variable reference PWM of the present disclosure may be applied to a three-phase inverter that is coupled to an AC or brushless DC motor, a simplified example of which is provided in FIG. 1. As shown, the inverter circuit 100 generally includes a DC power supply 102 and six switches identified as S1, S2, S3, S4, S5, and S6, which may be any type of an appropriate transistor switch such as an IGBT or MOSFET. The switches S1-S6 are coupled to a three-phase motor 104 at legs A, B and C. A programmable controller 106 is electrically coupled to the inverter circuit 100 and directs the switch operation. The programmable controller 106 makes use of various motor system data inputs including the DC bus voltage, the two-phase rotating reference frame voltages, which are calculated by the controller 106 from the three-phase AC quantities for use in subsequent calculation, and an electrical angle provided by a resolver or a rotary encoder on the motor.

Figure 2:
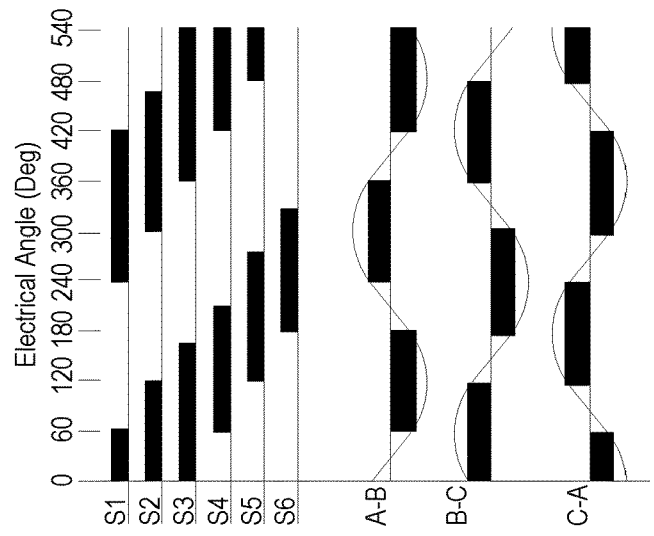
FIG. 2 is a timing diagram illustrating the timing of the switches of FIG. 1 to obtain three-phase alternating current with the upper graph illustrating the time that each switch is on/off and the lower graph illustrating the average phase voltage delivered across the legs of an AC motor.

In a traditional sinusoidal PWM modulation scheme, the inverter circuit 100 of FIG. 1 would be controlled to produce a three-phase sinusoidal output waveform. More specifically, the programmable controller 106 would direct the six switches to turn on and off according to a pulse diagram such as the one depicted in the upper graph of FIG. 2 (firing angle is provided along the top of the graph). In response, the inverter circuit 100 would deliver a three-phase sinusoidal voltage across the legs of the motor 104, e.g., across A-B, B-C and C-A, as illustrated in the pulse diagram (lower graph) of FIG. 2

The traditional sinusoidal waveforms delivered to the motor 104 are approximated sinusoidal waveforms generated through a PWM scheme programmed into the controller. PWM, or pulse width modulation, uses a rectangular pulse wave whose pulse width is modulated resulting in the variation of the average value of the waveform. FIGS. 3A-3D help to further illustrate this concept. FIG. 3A illustrates the average phase voltage of an inverter circuit 100 programmed to produce an approximated sinusoidal waveform. FIGS. 3B-3D illustrate various points along the waveform. For example, FIG. 3B illustrates the pulse wave of a high, average phase voltage amplitude of approximately 0.9 volts at approximately 170 deg. As shown, the width of the pulse is large to obtain the desired high, average voltage. FIG. 3C illustrates the pulse wave of a low, average phase voltage amplitude of approximately 0.1 volts at approximately 320 deg. As shown, the width of the pulse is small to obtain the desired low, average phase voltage. FIG. 3D illustrates the pulse wave of an intermediate, average phase voltage amplitude of approximately 0.5 volts at approximately 360 deg. As shown, the pulse lasts approximately half the width of the cycle to obtain the desired intermediate, average phase voltage.

With the traditional sinusoidal waveform illustrated in FIGS. 3A-3D, each point along the curve requires multiple transitions, e.g., a switch switching on to produce the pulse and switching off to stop the pulse. Each transition introduces losses into the circuit and limits the motor efficiency.

The three-phase variable reference PWM modulation scheme of the present disclosure is configured to improve motor efficiency by reducing the number of transitions and, thereby, the losses associate with those transitions. FIG. 4A illustrates the average phase voltage amplitude output of the inverter circuit 100 configured in accordance with the three-phase variable PWM scheme. The waveform of FIG. 4A illustrates one complete waveform of the average phase voltage that is produced using the repeating two cycle pattern of the three-phase variable PWM scheme. FIGS. 4B-4D illustrate various points along the waveform. For example, FIG. 4B illustrates the pulse wave of a high, average phase voltage amplitude of approximately 0.75 volts at approximately 190 deg. As shown, the width of the pulse is large to obtain the desired high, average phase voltage. FIG. 4C illustrates that at an average phase voltage of approximately 0 volts and an angle of approximately 300 deg., comprises a steady voltage; no pulsing is required meaning no switches are transitioning. FIG. 4D illustrates that at the maximum average phase voltage of approximately 1 volt and an angle of approximately 400 degrees a steady voltage is supplied; once again, no pulsing is required and no switches are transitioning.

The three phase variable reference PWM scheme that produces the phase voltage amplitude output waveform of FIG. 4A may be implemented by utilizing two equations that define the two duty cycles of the scheme. The first duty cycle, programmed within the controller 106 to occur between 0 deg. to 360 deg., may be deemed ground reference PWM whereby the average phase voltage amplitude during the first duty cycle is calculated in accordance with Equation (1).

$$dx\_min = K1 * \left[\left(\text{round}\left(\frac{Vx - \min(Va, Vb, Vc)}{Vdc}\right)\right)\right] \quad \text{Eq. (1)}$$

Where:
x=Phase A, B, or C voltage;
K1=maximum pwm count (reference: 699);
Vdc=DC link bus voltage measurement Note than PWM is normally implemented for a constant period where the voltage is applied for a part of the period. The larger part of time for which the voltage is applied, the larger the average voltage during that period. This is implemented by counting clock cycles during that period. The variable K1 is the maximum number of clock cycles during one period of the three phase variable reference PWM. After every period, the clock counter is reset and starts from zero.

The second duty cycle, programmed within the controller 106 to occur between 360 deg. to 720 deg., may be deemed DC bus reference PWM whereby the average phase voltage amplitude during the second duty cycle is calculated in accordance with Equation (2).

$$dx\_max = K1\left[1 + \left(\text{round}\left(\frac{Vx - \max(Va, Vb, Vc)}{Vdc}\right)\right)\right] \quad \text{Eq. (2)}$$

Where:
x=Phase A, B, or C voltage
K1=maximum pwm count (reference 699)
Vdc=DC link bus voltage measurement Note that at low speeds where the phase voltage amplitude is low, and if the inverter uses a traditional bootstrapping gate drive topology, e.g., a bootstrapping capacitor is used to maintain voltage during switching transitions, only ground reference PWM (Equation (1)) is used. The lack of switching, as illustrated in FIG. 4C, enables the bootstrapping capacitor to remain charged.

The three phase variable reference PWM scheme described above provides for reduced three phase bridge (inverter) losses resulting in higher motor efficiency. Further, the three-phase variable PWM scheme provides for more even thermal heating of the power electronics, e.g., instances of no pulsing means no switching and, thereby, no heat generation by the switch. The more even thermal heating reduces hot spots in the power electronics and may improve longevity of the electronics. The three-phase variable PWM scheme also provides for simplified implementation through programmable equations.

Figure 5:
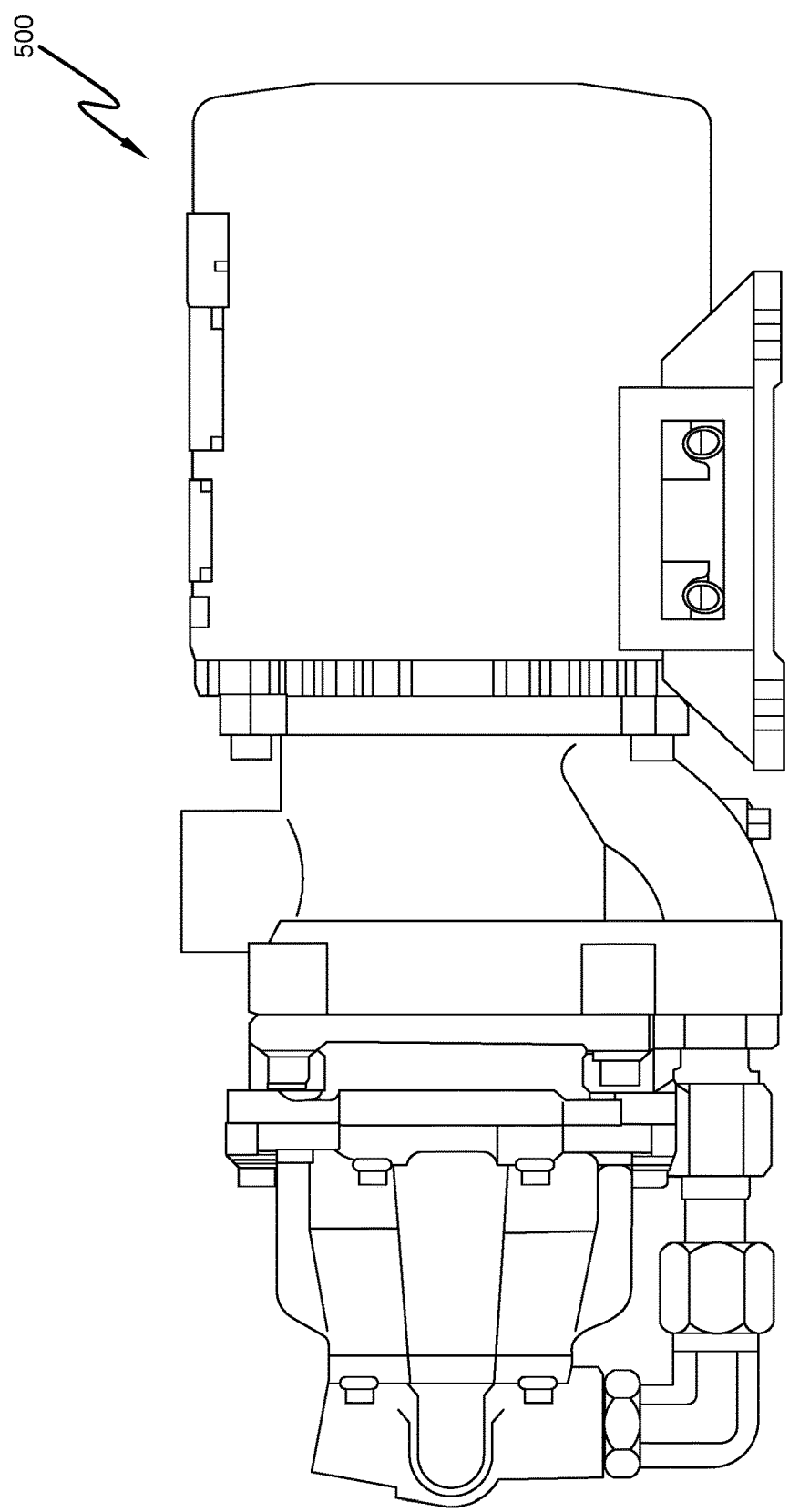
FIG. 5 is an illustration of an example hydro-electric motor pump that may utilize a motor in combination with the three phase variable reference PWM scheme in accordance with various embodiments of the present disclosure.
Figure 6:
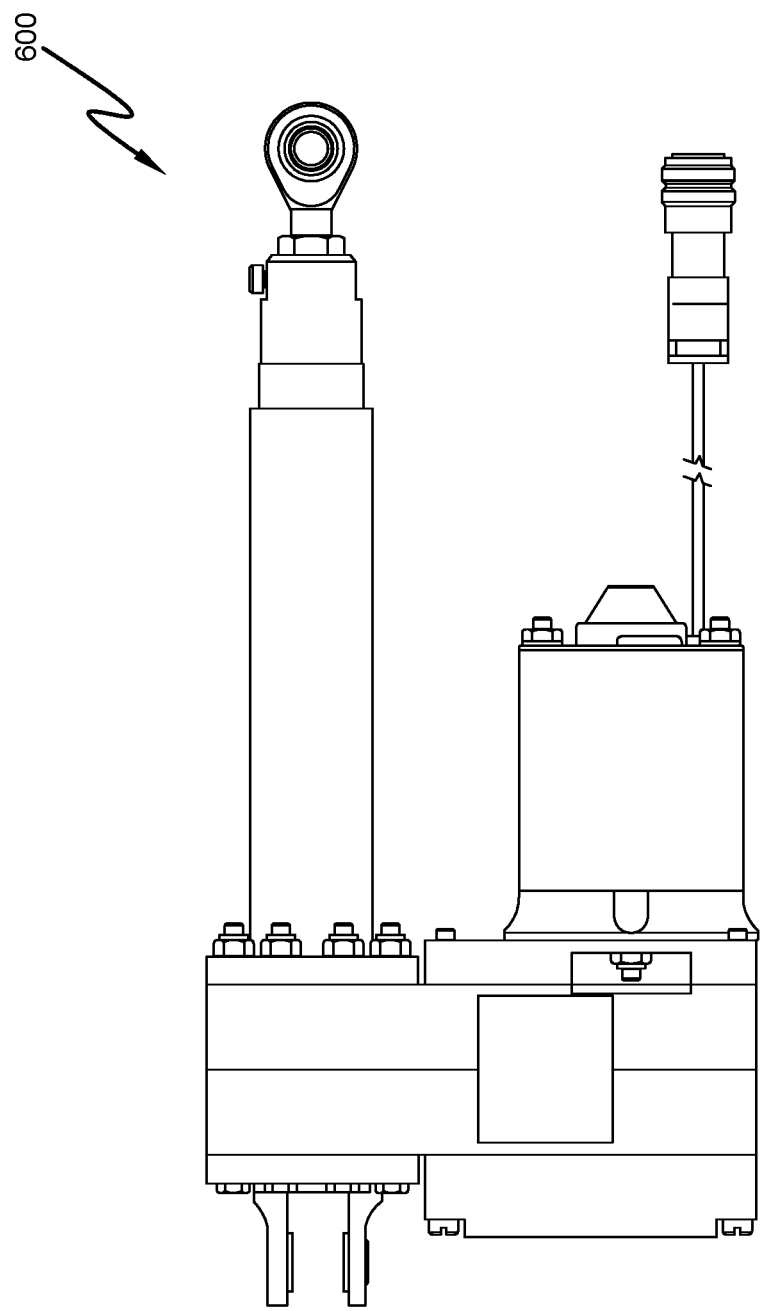
FIG. 6 is an illustration of an example electro-mechanical actuator that may utilize a motor in combination with the three phase variable reference PWM scheme in accordance with various embodiments of the present disclosure.

The three phase variable reference PWM scheme of the present disclosure may be used with any three phase AC or brushless DC motor. However, the scheme may be particularly suited to aeronautical applications where the three phase motor is utilized in hydro-electric motor pumps or electro-mechanical actuators. One example of a hydro-electric motor pump is the VICKERS® Fluid Cooled AC Motorpump (MPEVS-032Series) 500 which is illustrated in FIG. 5 and is manufactured by Eaton; this motor pump is designed to provide continuous hydraulic power for commercial and military aircraft. One example of an electro-mechanical actuator 600 with a three phase motor is illustrated in FIG. 6; this and other types of electro-mechanical actuators suitable for aeronautic applications are also available from Eaton.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. For example, there are many variations of the three phase inverter circuit of FIG. 1 that those skilled in the art are familiar with and to which the three phase variable reference PWM scheme of the present disclosure may be applied. Accordingly, the scope of the present disclosure should not be limited by the particular embodiments described above, but should be defined only by the claims set forth below and equivalents thereof.

We claim:

1. A system comprising:
  a motor comprising a three phase AC or brushless DC motor, the motor having three legs of power including a first phase leg, a second phase leg and a third phase leg;
  an inverter comprising a three-phase six-switch inverter electrically coupled to the motor, wherein a first pair of the six switches are coupled to the first phase leg, a second pair of the six switches are coupled to the second phase leg, and a third pair of the six switches are coupled to the third phase leg; and
  a controller communicatively coupled to the inverter, the controller configured to control the inverter to deliver an average phase voltage to the motor phase legs in accordance with a single three-phase pulse width modulation scheme having a first duty-cycle and a second duty-cycle,
  wherein, during the first duty-cycle of the motor: (a) a minimum DC bus voltage is used as reference to the pulse width modulation scheme; (b) only two pairs of switches, corresponding to two of the phase legs, of the three pairs of switches are transitioning according to a first switching pattern; (c) the third phase leg is coupled to the minimum DC bus voltage; and (d) an average phase voltage amplitude is calculated using the following equation:

$$dx\_min = K1 * \left[\left(\text{round}\left(\frac{Vx - \min(Va, Vb, Vc)}{Vdc}\right)\right)\right]$$

Where:
    x=Phase A, B, or C voltage;
    K1=maximum pwm count (reference: 699);
    Vdc=DC link bus voltage measurement and wherein, during the second duty-cycle of the motor: (a) a maximum DC bus voltage is used as reference to the pulse width modulation scheme; (b) only two pairs of switches, corresponding to two of the phase legs, of the three pairs of switches are transitioning according to a second switching pattern different from the first switching pattern; (c) the third phase leg is coupled to the maximum DC bus voltage; and (d) an average phase voltage amplitude is calculated using the following equation:

$$dx\_max = K1\left[1 + \left(\text{round}\left(\frac{Vx - \max(Va, Vb, Vc)}{Vdc}\right)\right)\right]$$

Where:
    x=Phase A, B, or C voltage
    K1=maximum pwm count (reference 699)
    Vdc=DC link bus voltage measurement.

2. The system of claim 1, wherein the first and second switching patterns repeat every 720 electrical degrees, wherein the first duty-cycle of the single three-phase pulse width modulation scheme occurs at a phase voltage angle of 0 to 360 degrees and the second duty-cycle of the single three-phase pulse width modulation scheme occurs at a phase voltage angle of greater than 360 degrees to 720 degrees.

3. The system of claim 1, wherein the motor drives a hydro-electric motor pump.

4. The system of claim 1, wherein the motor drives an electro-mechanical actuator.

5. The system of claim 1, wherein the first and second switching patterns alternate during a conduction period.

6. A method comprising:
  controlling a six-switch inverter to deliver an average phase voltage at the phase legs of a three phase motor through a single three-phase pulse width modulation scheme that is performed over a first and a second duty-cycle, wherein a first pair of the six switches are coupled to a first phase leg, a second pair of the six switches are coupled to a second phase leg, and a third pair of the six switches are coupled to a third phase leg, the controlling including:
    controlling the six-switch inverter to deliver an average phase voltage to the motor while transitioning the pairs of switches of only two of the three phase legs while the third phase leg is at a minimum DC bus voltage during the first duty-cycle, the average phase voltage during the first duty cycle being calculated according to the following equation, $$dx\_min = K1 * \left[\left(\text{round}\left(\frac{Vx - \min(Va, Vb, Vc)}{Vdc}\right)\right)\right]$$

Where:
      x=Phase A, B, or C voltage
      K1=maximum pwm count (reference 699)
      Vdc=DC link bus voltage measurement; and
    controlling the six-switch inverter to deliver an average phase voltage to the motor while transitioning the pairs of switches of only two of the three phase legs while the third phase leg is at a maximum DC bus voltage during the second duty-cycle, the average phase voltage during the second duty cycle being calculated according to the following equation, $$dx\_max = K1\left[1 + \left(\text{round}\left(\frac{Vx - \max(Va, Vb, Vc)}{Vdc}\right)\right)\right]$$

Where:
x=Phase A, B, or C voltage
K1=maximum pwm count (reference 699)
Vdc=DC link bus voltage measurement.

7. The method of claim 6, wherein the first duty-cycle occurs at a phase voltage angle of 0 to 360 degrees and the second duty-cycle occurs at a phase voltage angle of greater than 360 degrees to 720 degrees.

8. The method of claim 6, wherein the method comprises a hydro-electric motor pump implemented method.

9. The method of claim 6, wherein the method comprises an electro-mechanical actuator implemented method.

10. A controller comprising:
a programmable device configured to execute a program of instructions to implement a single three-phase pulse width modulation scheme, the instructions directing the programmable device to:
control six switches in a DC powered six-switch inverter to deliver at a three-phase motor an average phase voltage, wherein during a first duty-cycle, a first pair of the six switches is controlled to a non-transitioning state to couple a first phase leg of the three phase motor to a minimum DC bus voltage while a second and third pair of the six switches, which are coupled to a second and third phase leg respectively, are transitioned, and wherein during a second duty cycle, the first pair of the six switches is controlled to a non-transitioning state to couple the first phase leg of the three phase motor to a maximum DC bus voltage while the second and third pair of the six switches are transitioned, wherein the average phase voltage during the first duty cycle is calculated according to the following equation:

$$dx\_min = K1 * \left[\left(\text{round}\left(\frac{Vx - \min(Va, Vb, Vc)}{Vdc}\right)\right)\right]$$

Where:
x=Phase A, B, or C voltage
K1=maximum pwm count (reference 699)
Vdc=DC link bus voltage measurement, and
wherein the average phase voltage during the second duty cycle is calculated according to the following equation:

$$dx\_max = K1\left[1 + \left(\text{round}\left(\frac{Vx - \max(Va, Vb, Vc)}{Vdc}\right)\right)\right]$$

Where:
x=Phase A, B, or C voltage
K1=maximum pwm count (reference 699)
Vdc=DC link bus voltage measurement.

11. The controller of claim 10, wherein the programmable device is selected from a field programmable gate array (FPGA) or a processor.

12. The controller of claim 10, wherein the plurality of switches comprise a plurality of IGBTs or a plurality of MOSFETs.

13. The controller of claim 10, wherein the controller comprises hydro-electric motor pump motor controller.

14. The controller of claim 10, wherein the controller comprises an electro-mechanical actuator motor controller.

* * * * *